(12) United States Patent
Ikezoe et al.

(10) Patent No.: US 8,828,612 B2
(45) Date of Patent: Sep. 9, 2014

(54) FUEL CELL SYSTEM

(75) Inventors: Keigo Ikezoe, Ayase (JP); Yasushi Ichikawa, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 13/822,736

(22) PCT Filed: Sep. 13, 2011

(86) PCT No.: PCT/JP2011/070790
§ 371 (c)(1),
(2), (4) Date: Mar. 13, 2013

(87) PCT Pub. No.: WO2012/036143
PCT Pub. Date: Mar. 22, 2012

(65) Prior Publication Data
US 2013/0171531 A1  Jul. 4, 2013

(30) Foreign Application Priority Data
Sep. 17, 2010  (JP) ................ 2010-209824

(51) Int. Cl.
*H01M 8/06* (2006.01)
*H01M 8/04* (2006.01)
(52) U.S. Cl.
CPC ............ *H01M 8/04097* (2013.01); *Y02E 60/50* (2013.01); *H01M 8/04753* (2013.01); *H01M 8/04388* (2013.01)
USPC ........... 429/408; 429/415; 429/427; 429/428; 429/443; 429/454; 429/455; 429/513

(58) Field of Classification Search
CPC .................... H01M 8/04097; H01M 8/04388; H01M 8/04753; H01M 8/04298; Y02E 60/50
USPC ......... 429/408, 415, 427, 428, 443, 444, 454, 429/455, 502, 513
See application file for complete search history.

(56) References Cited

U.S. PATENT DOCUMENTS

2010/0068569 A1 *  3/2010  Suematsu ................ 429/13

FOREIGN PATENT DOCUMENTS

| JP | 2002-151116 A | 5/2002 |
|---|---|---|
| JP | 2002-216811 A | 8/2002 |
| JP | 2002-237322 A | 8/2002 |
| JP | 2003-151588 A | 5/2003 |

(Continued)

*Primary Examiner* — Patrick Ryan
*Assistant Examiner* — Ben Lewis
(74) *Attorney, Agent, or Firm* — Young Basile

(57) ABSTRACT

The fuel cell system is simplified and made more compact while providing the favorable recirculation of hydrogen-containing off-gas regardless of the increase or decrease in its flow rate. The fuel cell system is provided with: a cell unit that generates electricity by means of separating hydrogen-containing gas and oxygen-containing gas from each other while placing in flow contact to each other; and a recirculation mechanism for recirculating to the cell unit hydrogen-containing off-gas discharged from the cell unit. The fuel cell system has a flow rate determination unit that determines whether or not the hydrogen-containing gas fed to the cell unit is less than a predetermined flow rate; and a gas feeding pressure varying mechanism that cause the pressure of the hydrogen-containing gas to vary to increase and decrease when it is determined that the hydrogen-containing gas fed to the cell unit is less than the predetermined flow quantity.

9 Claims, 7 Drawing Sheets

(56) References Cited

FOREIGN PATENT DOCUMENTS

| JP | 2005-044748 A | 2/2005 |
| JP | 2005-150090 A | 6/2005 |
| JP | 2006-134695 A | 5/2006 |
| JP | 2006-252918 A | 9/2006 |
| JP | 2006-331863 A | 12/2006 |
| JP | 2007-149423 A | 6/2007 |
| JP | 2009-252654 A | 10/2009 |

* cited by examiner

C(C1,C2, C5-C7)

FUEL CELL SYSTEM

TECHNICAL FIELD

The present invention relates to a fuel cell system having a cell unit using a solid polymer type cell, for example.

BACKGROUND

The conventional fuel cell system of fuel recirculation type disclosed in the Japanese Laid-Open Patent Application Publication No. 2003-151588 is provided with a fuel cell to which a hydrogen gas as fuel and air as oxidant are respectively supplied for generating electricity, a fuel supply passage for supplying the above hydrogen gas to the fuel cell, a fuel recirculation passage for merging a hydrogen-containing off-gas as a unreacted fuel gas that has been discharged from the fuel cell at somewhere in the above fuel supply passage for re-circulating above hydrogen gas, a fuel pump for taking in the above hydrogen-containing off-gas to feed, and an ejector to inhale or taking in the above hydrogen-containing off-gas by making use of a negative pressure generated by the flow of the above hydrogen gas for merging with the hydrogen gas.

In the fuel cell system with a fuel recirculation type disclosed in Japanese Laid-Open Patent Application Publication No. 2003-151588, when the amount of supply of hydrogen gas is small, the velocity at the ejector nozzle is reduced, and due to the reduced Bernoulli effect, the hydrogen-containing off-gas is not sufficiently available for recirculation. Focusing on this phenomenon, at a low load condition with small supply or feed of hydrogen gas, a fuel pump is installed to take the hydrogen-containing off-gas in and subsequently deliver or feed.

However, in the above described configuration, in addition to providing the fuel pump, control of the fuel pump must be carried out so that the system becomes complicated with the difficulty to achieve system compactness.

BRIEF SUMMARY

The present invention is intended to provide a fuel cell system that can recirculate the hydrogen-containing off-gas well regardless of changes in the flow rate of hydrogen-containing gas so that the system is simplified and made compact.

The present invention for solving the above problem is provided in a fuel cell system including a cell unit that generates power/electricity by separating hydrogen-containing gas and oxygen-containing gas from each other and in flowing contact with each other and a recirculation mechanism that recalculates hydrogen-containing off-gas discharged from the cell unit back to the cell unit by way of take-up or involution action of the hydrogen-containing gas fed to the cell unit, with a flow rate determination unit that determines whether or not the hydrogen-containing gas fed to the cell unit is less than a preset or predetermined flow rate, and a gas feeding pressure varying mechanism that causes the pressure of the hydrogen-containing gas to vary to increase and decrease intermittently.

According to the present invention, irrespective of the increase and decrease in the flow rate of hydrogen-containing gas, the hydrogen-containing off-gas may be effectively recalculated and system is thus simplified to achieve compactness. In addition, when hydrogen-containing off-gas may not be circulated, by causing the anode pressure to increase and decrease intermittently, impurities within the solid polymer cell (water, nitrogen, etc.) are discharged. Thus, the hydrogen gas concentration across the upstream and downstream of the anode of solid polymer cell may be collectively improved accompanied by a more stable power generation.

BRIEF DESCRIPTION OF THE DRAWINGS

The description herein makes reference to the accompanying drawings wherein like reference numerals refer to like parts throughout the several views, and wherein.

DETAILED DESCRIPTION

Descriptions of embodiments to carry out the present invention are now made below with reference to accompanied drawings.

Figure 1A:
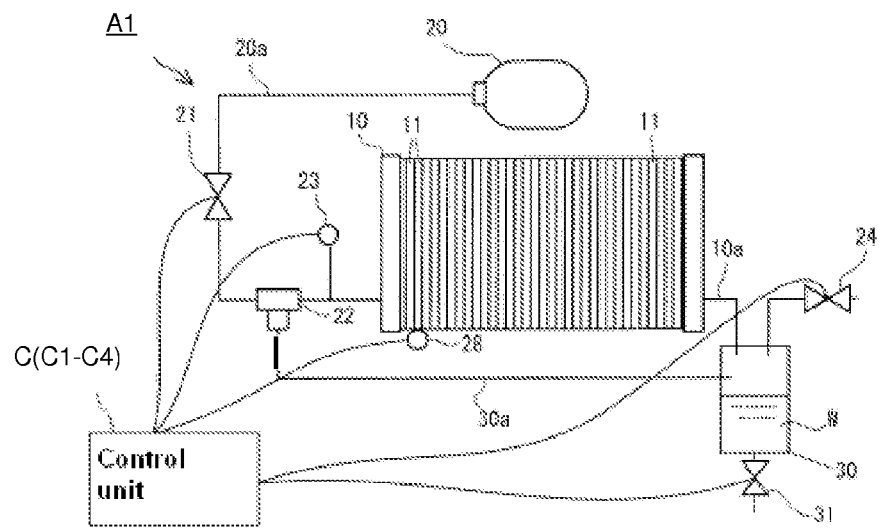
FIG. 1A is an explanatory diagram showing a schematic configuration of a fuel cell system according to one embodiment of the present invention.
Figure 1B:
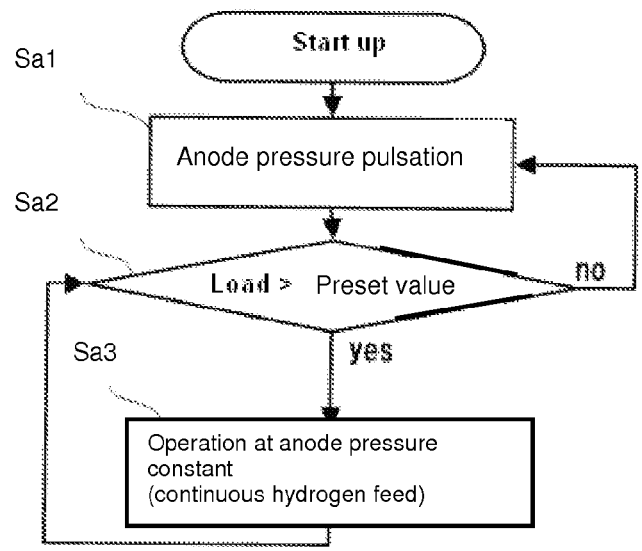
FIG. 1B is a flowchart showing the operations at the time of startup.

FIG. 1A is an explanatory diagram showing a schematic configuration of a fuel cell system A1 according to a first embodiment of the present invention, and FIG. 1B is a flowchart showing the operations of the fuel cell system A1 at the time of startup.

Note that, in FIGS. 1, 3, 5 and 6, among circulation systems of hydrogen-containing gas and oxygen-containing gas, only that for hydrogen-containing gas is illustrated and thus the diagram is somewhat simplified by omitting the illustration of the circulation system for oxygen-containing gas.

The fuel cell system A1 in the first embodiment according to the present invention is configured to include, in addition to cell stack 10, a fuel tank 20, a pressure regulating valve or modulator 21, an ejector 22, a pressure sensor 23, a temperature sensor 28, a nitrogen purge valve 24, a separate tank 30, water drain valve 31, etc. together with a control unit C.

The cell stack 10 is obtained by stacking a plurality of cell units 11 with a spacing from each other and is configured to generate electricity/power by separating hydrogen-containing gas and oxygen-containing gas from each other in flow contact to each other with one gas at the outside and the other gas inside of each cell unit 11 so as to be in flowing contact with each other.

In the present embodiment, description is made by assuming "hydrogen gas" as the "hydrogen-containing gas" and "air" as "the oxygen-containing gas". However, the compositions are not limited to these.

The cell units 11 are constructed by storing or accommodating a solid polymer cell composed of an anode and cathode disposed on both sides of an electrolyte (both not shown) between separators.

The fuel tank 20 is intended for storing a preset volume of hydrogen gas required to feed to the cell stack 10, and a delivery or feeding pipe 20a is connected between the fuel tank 20 and the receiving portion of the cell stack 10.

The pressure regulating or modulator valve 21 has function to regulate or modulate the pressure of hydrogen gas fed from fuel tank 20 steplessly or continuously and is provided somewhere at the intermediate portion of the feel pipe 20a, and is in communicative with the output side of control unit C detailed later for controlling the pressure to increase or decrease.

In the present embodiment, pressure regulating valve 21 presents a pressure regulating portion that adjusts to increase or decrease the pressure at the receiving portion from the fuel tank of supply or feeding source of hydrogen gas, and thus the pressure of hydrogen gas fed to anode of each cell unit 11. By providing such a pressure adjustment part, the pressure of hydrogen gas fed to anode may be varied to increase or decrease with ease.

To the discharge portion of the cell stack 10 is connected a separate tank 30 described later via discharge pipe 10a, as well as a recirculation pipe 30a as recirculation path between the separator tank 30 and ejector 22.

In other words, the hydrogen-containing gas effluent discharged from the anode of the cell stack 10 is refluxed or recalculated to the cell stack 10 via the ejector 22.

The ejector 22 is disposed in the feeding pipe 20a on the downstream side of the pressure regulator valve 21. This ejector 22 has a function to reflux or recalculate a hydrogen-containing discharged gas or off-gas from the cell stack 10 to the anode through a recirculation pipe 30a by way of the involving action incurred by hydrogen gas flowing through the feed pipe 20a. In addition, instead of the ejector 22 as recirculation unit, a HRB (abbreviated for hydrogen recirculation blower, referred to as "HRB" below) may be provided and a three-way tube is used instead of ejector 22 to configure a recirculation mechanism.

That is, the ejector 22 solely constitutes a recirculation mechanism, and the HRB combined with three-way tube makes up the recirculation mechanism. Moreover, in addition to provision of ejector 22, such a recirculation mechanism may be conceivable in which ejector 22 is provided along with a recirculation pipe 30a with the HRB installed.

The pressure sensor 23 is intended to measure the pressure of the hydrogen gas that is discharged from the ejector 22, and is disposed in the feeding pipe 20a at downstream of the ejector 22. The pressure sensor is further connected to input side of the control unit C.

The temperature sensor 28 is provided for measuring the temperature of cell stack 10, and thus the temperature of cell unit 11 and is connected to input side of control unit C.

The separate tank 30 stores water w contained in the hydrogen-containing off-gas discharged from anode, and the water w stored in the separate tank 30 is constructed to be discharged through discharge valve 31 to the outside.

In addition, the drain valve 31 is connected to the output side of the control unit C and is adapted to be controlled to open/close appropriately. The nitrogen purge valve 24 is provided for discharging the nitrogen gas staying in the separate tank 30, and is connected to the output side to be controlled to open/close.

The controller C is composed of a CPU (Central Processing Unit), interface circuits, etc., and through the run of required programs, various functions below will be performed.

(1) Function to determine whether or not the hydrogen-containing gas fed to cell unit 11 is less than a predetermined flow rate. This function is referred to as "flow rate determination unit C1".

The "determination whether or not the flow rate is less than a predetermined flow rate" is made depending on whether or not the load is lower than 10% of maximum output. Note that in a general ejector designed for the required value at maximum output, a low load less than 10% (recirculation is not available at a low flow rate region) is confirmed experimentally.

Specifically, the "predetermined flow rate" is such a flow rate at which hydrogen-containing off-gas cannot be recirculated to cell unit 11. In other words, such a flow rate of hydrogen gas is indicated at which recirculation to cell unit 11 through recirculation pipe 30a would not take place.

(2) The function to cause the pressure of hydrogen-containing gas to fluctuate or vary to increase and decrease when it is determined that hydrogen-containing gas fed to the cell unit 11 is less than a predetermined flow rate. This function is referred to as "gas feed pressure varying mechanism C2".

In the present embodiment, through the pressure regulating valve 21 corresponding to the pressure regulating portion above, the pressure of hydrogen gas fed to anode of cell unit 11 is fluctuate or vary to increase and decrease intermittently. However, the intermittent fluctuation is not necessarily required.

Note that, when the flow rate of hydrogen gas exceeds a predetermined flow rate, feeding of the hydrogen gas is carried out maintaining the feed pressure thereof at constant.

The language, "intermittently" is intended to include irregular intervals in addition to equally spaced. In addition, the width of the change or variation in pressure increase and decrease are configured so as to discharge the impurities in the solid polymer cell. Specifically, two values may be adopted, respectively representing a value of relatively high pressure at which water may be discharged, and the other value of relatively low pressure that can expel nitrogen gas etc.

For example, the relatively low pressure value may be used for a normal pressure fluctuation or pulsation to discharge nitrogen gas to repeat the pressure variation a predetermined number of times, and subsequently a pressure fluctuation or pulsation of relatively high pressure and the like is followed during which water may be discharged.

That is, in a situation in which hydrogen-containing off-gas may not be recirculated, by causing the anode pressure to vary to increase and decrease intermittently to discharge impurities (water, nitrogen, etc.) in the solid polymer cell. Thus, the overall concentration of hydrogen gas may be raised across upstream and downstream of the anode of solid polymer cell to ensure a stable power generation.

The operation of the fuel cell system A1 at startup is now described with reference to FIG. 1B.

Step 1: In FIG. 1B, abbreviated as "Sa1". The same applies hereinafter. Hydrogen gas is delivered or fed to anode by intermittently varying to increase and decrease the pressure of hydrogen gas fed from fuel tank 20.

Step 2: It is determined whether or not the load is larger than a predetermined value, and in response to the determination of the load being larger than the predetermined flow rate, control proceeds to step 3, Otherwise, control returns step S1.

Step 3: Control allows hydrogen gas to be delivered continuously so that the anode pressure becomes constant, and returns to step 2.

Figure 2:
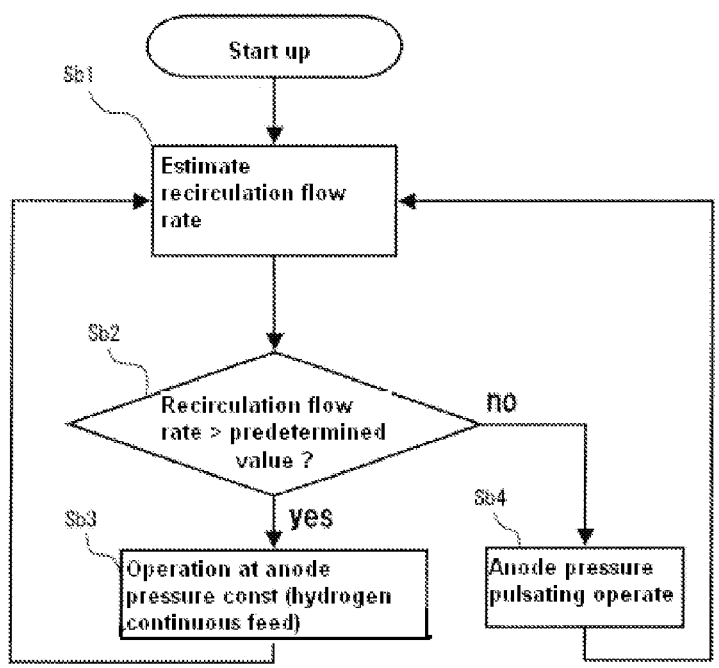
FIG. 2 shows a flowchart illustrating the operation of the fuel cell system at the time of its startup in a second embodiment.

Next, description is made of the fuel cell system according to the second embodiment of the present invention with reference to FIGS. 1A and 2. FIG. 2 is a flowchart showing the operations at startup of the fuel cell system A2 in the second embodiment.

Since the hardware configuration of the fuel cell system A2 is the same as those described in the fuel cell system A1 according to the first embodiment described above, the description about the difference is made here.

The fuel cell system A2 differs from the above described fuel cell system A1 in that, in place of the above described flow rate determination unit, functions assigned to a recirculation flow rate determination mechanism C4 is provided along with a recirculation flow rate estimate mechanism C3.

Specifically, the controller C in the present embodiment performs, by way of execution of appropriate programs, a recirculation flow rate estimate mechanism C3 and a recirculation flow rate determination mechanism C4, respectively.

(3) The function to estimate the recirculation flow rate of hydrogen-containing off-gas refluxed or re-circulated to cell unit 11 via ejector 22. This function is referred to as "recirculation flow rate estimate mechanism C3".

The "temperature" is detected by a temperature sensor 28 disposed at an appropriate location of cell stack 10.

In other words, the nitrogen concentration will be able to be estimated based on temperature, pressure, load and the nitrogen purge valve 24 with opening degree corresponding thereto. In the present embodiment, the degree of opening of the valve 24 is controlled in order to maintain nitrogen at a certain concentration. That is, control unit C has the function to open and close the nitrogen purge valve 24 in accordance with temperature, pressure, load, and these parameters. This function is referred to as "nitrogen concentration adjusting mechanism".

Based on the load and temperature, since the flow velocity of a primary stream (i.e. hydrogen gas delivered from fuel tank 20 to cell stack 10) is acquired, the volume flow rate of hydrogen-containing off-gas may be obtained. Once the volume flow rate is obtained, the mass flow rate of the hydrogen-containing off-gas re-circulated may be calculated based on the nitrogen concentration and water vapor concentration at that time. In addition, the water vapor concentration may be estimated by the temperature.

(4) The function to determine whether or not the estimated flow rate of re-circulation hydrogen-containing off-gas is less than a predetermined flow rate. This function is referred to as "recirculation flow rate determination mechanism C4".

In this instance, when the recirculation flow rate estimate is held less than the predetermined flow rate, gas feeding pressure varying mechanism C2 is operable to vary to increase and decrease intermittently the hydrogen gas pressure fed to anode. As for "a predetermined flow rate", reference is made to the above description.

The operation of the fuel cell system A2 configured above will now be described with reference to FIG. 2. Step 1: In FIG. 2, Step 1 is abbreviated as "Sb1". The same applies hereinafter. The recirculation flow rate of hydrogen-containing off-gas discharged from anode is estimated as described above.

Step 2: A determination is made as to whether or not the recirculation flow rate of hydrogen-containing off-gas is greater than a predetermined flow rate, and upon the determination that the flow rate of hydrogen-containing off-gas is larger than the predetermined flow rate, control proceeds to step 3 while otherwise returns to Step 4.

Step 3: Feeding the hydrogen gas continuously so that the anode pressure attains a constant pressure, and control subsequently returns to Step 2.

Step 4: The hydrogen gas fed from fuel tank 20 is delivered under pressure to anode intermittently and control returns to Step 1.

According to the embodiment described above, the following effects are obtained. As compared to the case with respect to the fuel cell system A1 described above where determination is made based on the load only, ejector 22 may be used in a more preferable condition.

Further, the same applies when, in lieu of ejector 22, the HRB is disposed in the recirculation pipe 30a and a three-way tube is provided in place of ejector 22 to form a recirculation mechanism, or, in addition to ejector 22, a recirculation pipe 30a with HRB attached to form a recirculation mechanism.

During intermittent operation, the pressure applied to anode will be higher on average than the pressure applied to cathode so that fuel economy is deteriorated due to increased amount of hydrogen permeation to the cathode. However, by using ejector 22 suitably, the pressure needs not to be raised unnecessarily so that fuel economy may be improved.

Figure 3A:
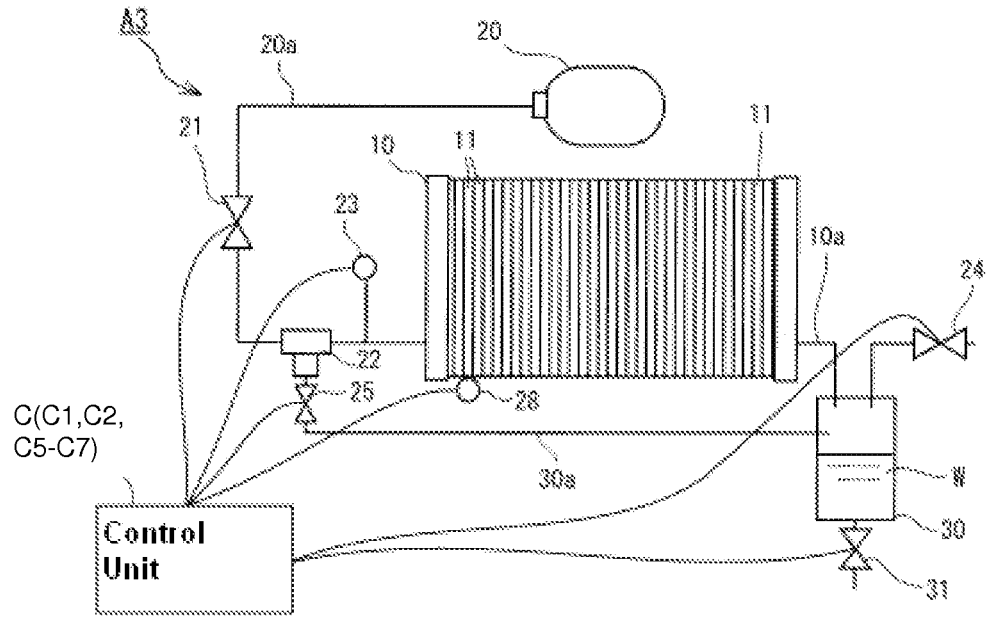
FIG. 3A is an explanatory diagram showing a schematic configuration of a fuel cell system according to a third embodiment of the present invention.
Figure 3B:
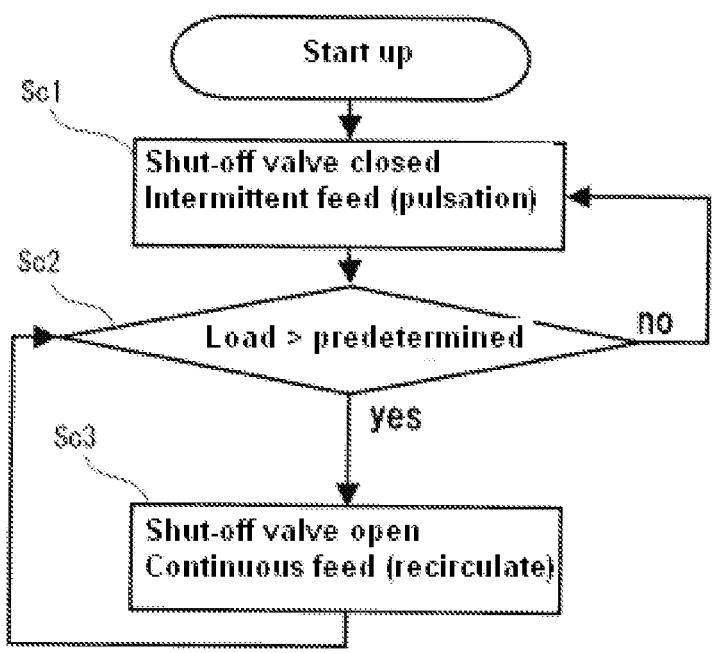
FIG. 3B is a flowchart showing the operation at the time of its startup.

Next, the fuel cell system according to a third embodiment of the present invention will be described with reference to FIGS. 3A and B. FIG. 3A is an explanatory diagram showing a schematic configuration of a fuel cell system in a third embodiment according to the present invention, and FIG. 3B is a flowchart showing the operation of the fuel cell system pertaining to the third embodiment at startup.

For the hardware configuration of the fuel cell system A3 in the third embodiment, since a shut-off valve 25 is added to those described in the fuel cell system A1 in the first embodiment described above, description of those will be omitted here by assigning the same reference numerals in the instant embodiment to those matters equivalent to and described in the first embodiment described above. Here, description is specifically made of the difference.

Note that, in this embodiment as well, instead of the ejector 22, a recirculating mechanism may be formed in which the HRB is attached to recirculation pipe 30 together with a three-way tube instead of ejector 22. Needless to say, it may be further conceivable that, in addition to provision of ejector 22, recirculation pipe 30a is configured to have the HRB attached to form a recirculation mechanism.

The shut-off valve 25 is so-called ON-OFF valve disposed in recirculation pipe 30a in order to shut off hydrogen-containing off-gas communicating in the recirculation pipe 30a.

In the present embodiment, shut-off valve 25 represents a fluid communication control portion for preventing the backflow of hydrogen off-gas (hydrogen-containing off-gas) into the cell unit 11. This communication control portion is provided to perform or stop recirculation process in accordance with temperature, as described later.

That is, by applying pressure on the side of recirculation valve 30a at pressure increase during intermittent operation, the backflow of hydrogen-containing off-gas to cell stack 10 is thus prevented. By arranging such a shut-off valve 25 in recirculation pipe 30a, more stable power generation is ensured.

That is, the control unit C has the following function in this embodiment.

(5) When it is determined that hydrogen-containing gas fed to the cell unit 11 is less than the predetermined flow rate, the function of stopping or shutting off the hydrogen-containing off-gas flowing in recirculation passage 30a by shut off valve 25. This function is referred to as "gas shut-off mechanism".

(6) The function to determine whether or not the temperature of cell unit detected by the temperature sensor has entered a predetermined temperature range including freezing point temperature.

This function is referred to as "cell temperature determination mechanism C6".

The "predetermined temperature region including freezing point temperature" is specified by such a temperature range below about 20° C. at which a dead end operation is difficult due to increase in nitrogen permeation amount from the cathode and which corresponds to the maximum temperature at which icing of ejector 22 would not be caused even in consideration of tolerances in sensors etc. and the heat capacity of ejector 22.

In addition, even if the HRB is provided in recirculation pipe 30a as recirculation mechanism, the temperature region is below about 20° C. that corresponds to a maximum temperature that does not cause icing.

The "icing" indicates that the water vapor during recirculation from the cell stack 10 is cooled by the supply of hydrogen under freezing point from the fuel tank 20 and is frozen or clogged in the ejector nozzle.

In addition, even when the HRB is provided to recirculation pipe 30a as recirculation mechanism while a three-way tube is provided in lieu of ejector 22, the "icing" indicates that the water vapor during recirculation from the cell stack 10 is cooled by the supply of hydrogen under freezing point from the fuel tank 20 and is frozen or clogged in the three-way tube.

(7) The function to stop recirculation of water vapor by flow control portion 25 when the temperature of cell unit 11 detected has entered a predetermined temperature region including a freezing point (i.e., lowered to a predetermined temperature region including freezing point temperature). This function is referred to as "recirculation stopping mechanism C7".

Here, "a predetermined temperature region, including freezing temperature" is as described above. That is, in the present embodiment, together with the flow rate determination unit C1, gas feeding pressure varying mechanism C2, gas shut-off mechanism C5, cell temperature determination mechanism C9, and recirculation stopping mechanism C7 are provided.

The operation of the fuel cell system A3 configured above will be described also with reference FIG. 3B. Step 1: in FIG. 3B, this is abbreviated as "Sc1". The same applies hereinafter. The shut-off valve 25 is closed, and hydrogen gas fed from fuel tank 20 is intermittently fed under pressure-to anode.

Step 2: Determination is made whether or not load is larger than a predetermined flow rate, and when the load is determined to be greater than the predetermined flow rate, control proceeds to step 3, if not, control returns to step 1.

Step 3 Shut-off valve 25 is opened, and hydrogen gas is fed continuously at the same time to allow the anode pressure to be constant, and control returns to step 2.

Figure 4:
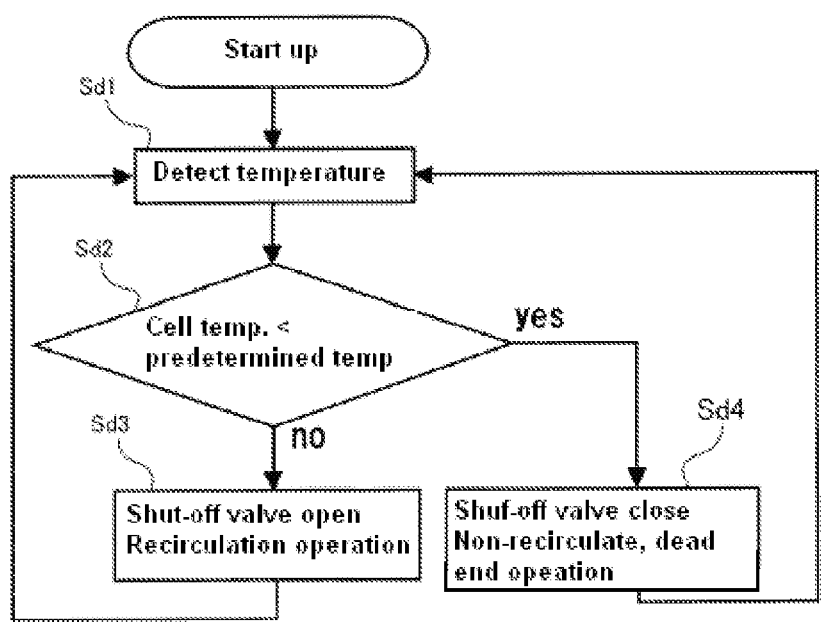
FIG. 4 is a flowchart showing the operation at the time of startup of a fuel cell system in a third embodiment.

The operation according to another example based on the temperature detected at startup of the fuel cell system A3 consisting of the above structure will be described with reference to FIG. 4. FIG. 4 is a flowchart showing the operation according to the other example at startup of the fuel cell system A3.

The operation according to the other example in this embodiment pertains to operation based on the temperature detection or sensing.

Temperature sensing" involves detection of a temperature sensor 28 disposed at a pertinent position of the cell stack 10.

Step 1: In FIG. 4, this is abbreviated as "Sd1". The same applies hereinafter. The temperature of the cell stack 10 is detected.

Step 2: Determination is made as to whether or not the temperature of the cell unit 11 entered a predetermined temperature region including a freezing point (whether or not lowered to a predetermined temperature region including a freezing point), and when the temperature is determined to have entered the predetermined temperature region including a freezing point (lowered to the predetermined temperature range including a freezing point), process proceeds to step 4, otherwise, process advances to step 3.

Step 3: Shut-off valve 25 is driven to be opened, and hydrogen-containing off-gas is recirculated via ejector 22.

Step 4: Shut-off valve 25 is driven to be closed, and the pressure of hydrogen gas fed from fuel tank 20 is intermittently varied to increase and decrease or pulsated to anode (recirculation is stopped).

Further, at low temperature and at the region in which nitrogen permeation amount is extremely low, the variation or pulsation in pressure to increase and decrease may not be required. Here, the "variation in pressure increase and decrease" may include such a mode without fluctuation.

According to the present embodiment, the following effects are obtained. The recirculation of water vapor at freezing point is stopped and icing of ejector may be prevented. Dead end operation is easily carried out due to small nitrogen permeation at low temperature even above the freezing point, depending upon the position of the temperature sensor, the ejector may be brought below freezing point, icing may be prevented even in this situation as well.

Figure 5:
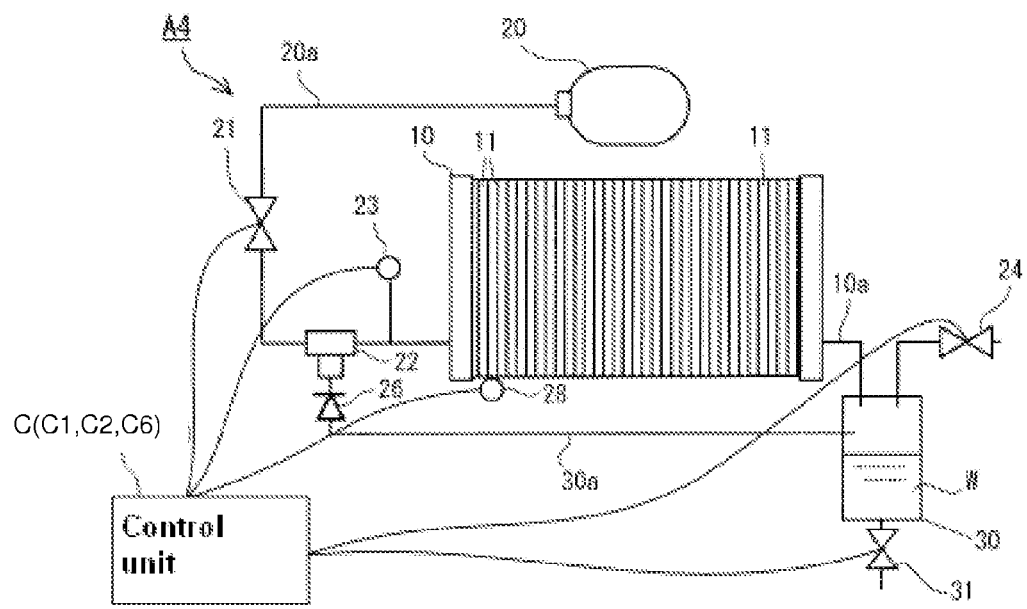
FIG. 5 is an explanatory diagram showing a schematic configuration of a fuel cell system according to a fourth embodiment of the present invention.

Next, the fuel cell system according to a fourth embodiment of the present invention will be described with reference to FIG. 5. FIG. 5 is an explanatory diagram showing a schematic configuration of a fuel cell system A4 according to the fourth embodiment of the present invention.

For the hardware configuration of the fuel cell system A4 according to the fourth embodiment, since a check valve 26 is disposed to that described in the above described first embodiment of the fuel cell system A1, in the present embodiment, for those that are equivalent to those described in the first embodiment, the explanation thereof is omitted here by attaching the same reference numerals. The difference therefrom is therefore described here.

Check valve 26 is intended to prevent the hydrogen-containing off-gas from flowing back to cell stack 10 due to pressure applied on the side of recirculation pipe 30a at the time of increase of pressure during the intermittent operation and disposed in the recirculation pipe 30a. By arranging the check valve 26, a more stable generation of power is made possible.

That is, in the present embodiment, by preventing the back flow of hydrogen-containing off-gas flowing in the recirculation passage 30a by check valve 26, the hydrogen-containing off-gas is prevented from flowing back to cell stack 10.

Figure 6A:
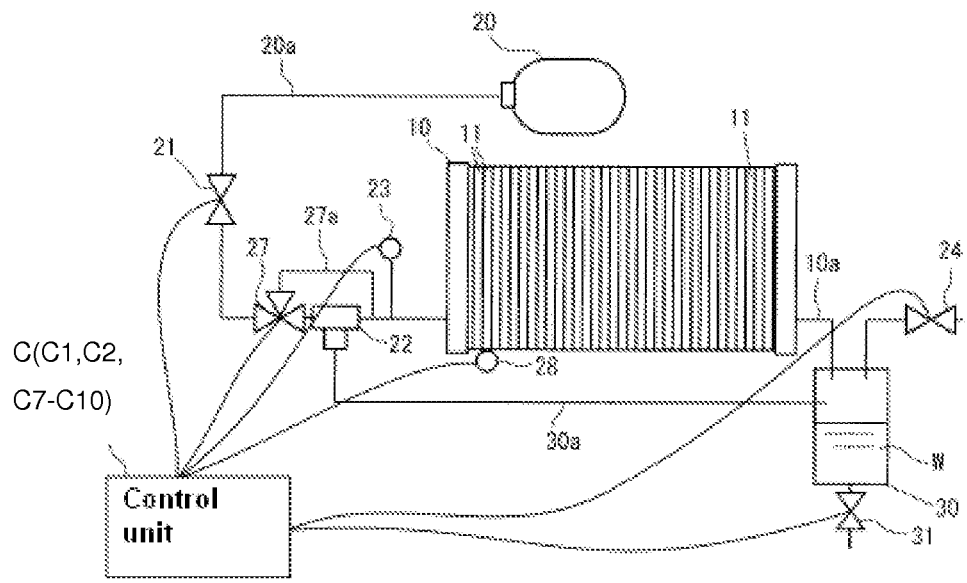
FIG. 6A is an explanatory diagram showing a schematic configuration of a fuel cell system according to a fifth embodiment of the present invention.
Figure 6B:
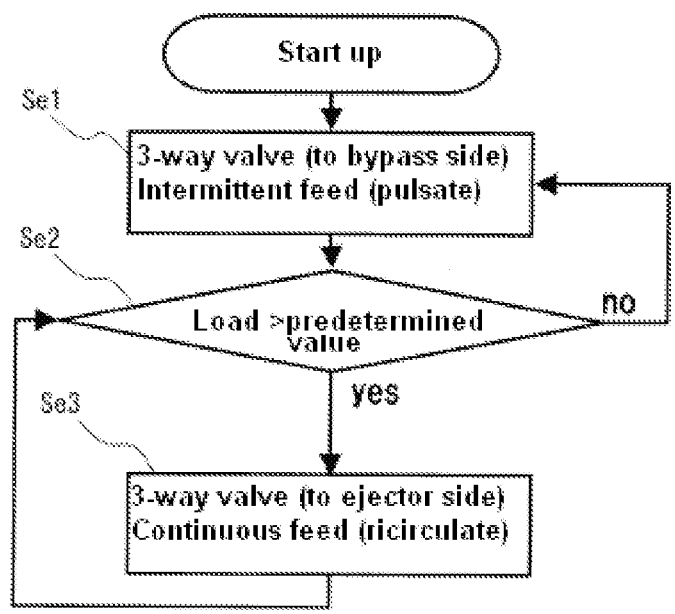
FIG. 6B is a flowchart showing the operation at the time of its startup.

Next, the fuel cell system according to a fifth embodiment of the present invention will be described with reference to FIGS. 6A and B. FIG. 6A is an explanatory diagram showing a schematic configuration of a fuel cell system A5 according to the fifth embodiment of the present invention. FIG. 6B is a flowchart showing the operation at the time of start-up.

For the hardware configuration of the system fuel cell A5 according to the fifth embodiment, a detour or bypass passage 27 and three-way valve 27a are added to those described in the first embodiment in the fuel cell system A1. Therefore, in the present embodiment, those equivalent to those described in the first embodiment are accompanied with the same reference signs to save for the explanation. Here the difference is explained.

The three-way valve 27 is provided at the upstream of ejector 27 disposed in the feed pipe 20 and at the location between the three-way valve 27 and downstream side of feed pipe 20a is provided a bypass pipe 27a as a detour path.

Note that, in this embodiment as well, instead of the ejector 22, HRB may be provided to recirculation pipe 30a with a three-way tube as a recirculation mechanism. Needless to say, in addition to ejector 22, such a configuration may be used as recirculation mechanism in which HRB is provided to recirculation pipe 30a.

This three-way valve 27 is connected to the output side of the control unit C, and is controlled to be switched appropriately.

That is, the control unit C has the following function in this embodiment.

(8) The function of feeding the hydrogen-containing gas toward cell unit 11 via three-way valve 27 is fed by switching to the detour or bypass passage 27a when the hydrogen-containing gas fed to cell unit 11 is determined to be less than a predetermined flow rate. This function is referred to "Bypass feeding mechanism C8".

That is, in the present embodiment, the bypass feeding mechanism C8 is provided in addition to flow rate determination unit C1 and gas feeding pressure varying mechanism C2.

Thus, when the intermittent operation is in place, ejector 22 is bypassed and the pressure loss across the ejector 22 may be avoided to perform a stable intermittent operation.

The operation of the system of the fuel cell system A5 configured above will be described with reference also to FIG. 6(B).

Step 1: In FIG. 6(B), this abbreviated as "Se1". The same applies hereinafter. With the three-way valve 27 being switched to allow for hydrogen gas to be fed to bypass pipe 27a, hydrogen gas will be fed intermittently to anode.

Step 2: It is determined whether or not the load is larger than a required flow rate, and if determined that the load is larger than the required value, process proceeds to step 3, otherwise process returns to step 2.

Step 3: The three-way valve 27 is switched to allow hydrogen gas to pass through ejector 22, hydrogen gas will be continuously fed so that the anode pressure will be set at constant, and process returns to step 2.

In the present embodiment, control unit C may be allowed to exert the following functions as well.

(9) The function of determining whether or not the temperature of cell unit measured by the temperature sensor has entered a predetermined temperature region including freezing point. This function is referred to as "cell temperature determination mechanism C9".

The definition of the "predetermined temperature region including freezing temperature" is referred to the above description.

(10) The function of switching to feed hydrogen-containing gas fed to cell unit via three-way valve to a bypass passage. This function is referred to as "bypass feeding mechanism C10".

Thus, when the intermittent operation is in place, by bypassing ejector 22, pressure loss of the ejector 22 may be avoided to perform a stable intermittent operation.

Figure 7:
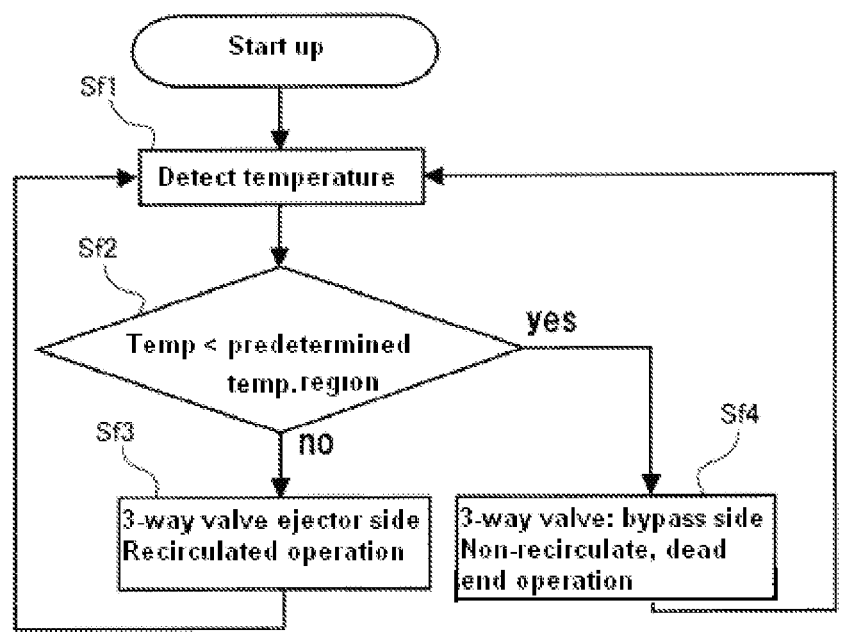
FIG. 7 is a flowchart showing the operation at the time of startup of the fuel cell system in a fifth embodiment.

The operation according to another example of the fuel cell system A5 consisting of the above structure at startup will be described with reference to FIG. 7. FIG. 7 is a flowchart showing the operation according to the other example of the fuel cell system A5 at startup.

The operation according to the other example of this embodiment is an operation performed based on the temperature detection.

"Temperature sensing or detection" is conducted by placing the temperature sensor 28 at a predetermined position of the cell stack 10.

Step 1: In FIG. 7, this step is abbreviated as "Sf1". The same applies hereinafter. The temperature of cell stack 10, and thus also of cell unit 11 is detected.

Step 2: It is determined whether or not the temperature of the cell unit 11 has entered a predetermined temperature region including freezing point temperature (lowered to the predetermined temperature region including a freezing point temperature), and if determined that the temperature of cell unit 11 has entered the predetermined temperature region including freezing point temperature (i.e., lowered to the predetermined temperature region including a freezing point temperature), process proceeds to step 4, and otherwise, process proceeds to step 3.

Step 3: Three-way valve 27 is switched to ejector 22, and control returns to step 1.

Step 4: With the three-way valve 27 switched to bypass pipe 27a, and at the same time the pressure of hydrogen gas is fed to anode from fuel tank 20 intermittently varied to increase and decrease (recirculation flow is stopped).

Further, at low temperature and N2 transmission or permeation through membrane is extremely small, pressure variation to increase/decrease may not be necessary. Note that such mode without pulsation may be included in "variation in pressure to increase/decrease".

Note that, in FIG. 7, "change or variation to increase or decrease the hydrogen gas pressure intermittently." is referred to as "dead-end operation without recirculation".

The present invention is not limited to the embodiments described above and the following modification or alterations are possible. Temperature sensor described above has been exemplified that was arranged to measure the temperature of the cell unit, but the configuration is not limitative, and a separate temperature sensor may be provided to measure the temperature of ejector for example, separate from the temperature sensor measuring the above descried cell unit.

The embodiments have been described in detail above. However, in any case, the configuration described in the above embodiments is not specific to each embodiment. The configuration explained in an embodiment may be applied or adopted, or any combination thereof may be possible.

The invention claimed is:
1. A fuel cell system including a cell unit generating power by separating hydrogen-containing gas and oxygen-containing gas in flow contact with each other, and a recirculation mechanism to recirculate hydrogen-containing off-gas discharged from the cell unit back to the cell unit, comprising:
  a flow rate determination mechanism configured to determine whether or not the hydrogen-containing gas fed to the cell unit is less than a predetermined flow rate;
  a gas feeding pressure varying mechanism configured to cause the pressure of the hydrogen-containing gas to vary by increasing or decreasing the pressure intermittently when the hydrogen-containing gas fed to the cell unit is determined to be less than the predetermined flow rate;
  a bypass passage provided at the feeding passage for bypassing the recirculation mechanism;

a three-way valve to switch to the bypass passage hydrogen-containing gas fed toward the cell unit;

a temperature sensor to detect a temperature of the cell unit;

a cell temperature determination mechanism configured to determine whether or not the cell unit temperature detected by the temperature sensor has entered a predetermined temperature region including a freezing point temperature; and a bypass feeding mechanism to switch and feed the hydrogen-containing gas fed toward the cell unit via the three-way valve to the bypass passage when the cell unit temperature has been determined to enter the predetermined temperature range containing freezing point temperature.

2. The fuel cell system as claimed in claim 1, wherein the predetermined flow rate is a flow rate at which the hydrogen-containing gas would not be recirculated to the cell unit.

3. The fuel cell system as claimed in claim 1, further comprising:

a feeding source of hydrogen-containing gas to the cell unit; and a pressure-regulating unit disposed in a feeding passage extending from the feeding source to the cell unit for varying by increasing or decreasing the pressure of hydrogen-containing gas being fed, wherein the gas feeding pressure varying mechanism causes the pressure of hydrogen-containing gas fed to the cell unit to vary by increasing or decreasing intermittently the pressure via the pressure regulating unit.

4. A fuel cell system including a cell unit to generate power by separating hydrogen-containing gas and oxygen-containing gas from each other while bringing in flow contact with each other, and a recirculation mechanism to recirculate hydrogen-containing off-gas to the cell unit by way of involution action of the hydrogen-containing gas fed to the cell unit, comprising:

a recirculation flow rate estimate mechanism configured to estimate the recirculation flow rate recirculated to the cell unit via the recirculation mechanism;

a recirculation flow rate determination mechanism configured to determine whether or not the recirculation flow rate of the estimated hydrogen-containing off-gas is less than a predetermined flow rate;

a gas feeding pressure varying mechanism to cause the hydrogen-containing gas fed to the cell unit to vary by increasing or decreasing the pressure intermittently when the estimated hydrogen-containing off-gas is determined to be less than the predetermined flow rate; and a bypass passage for bypassing the recirculation mechanism and a three-way valve to switch to the bypass passage hydrogen-containing gas fed toward the cell unit, wherein, when the hydrogen-containing gas fed to the cell unit is determined to be smaller than a predetermined flow rate, a bypass feeding mechanism is provided and the hydrogen-containing gas being fed to the cell unit via the three-way valve is switch to the bypass passage to feed.

5. The fuel cell system as claimed in claim 4, wherein the recirculation flow estimate mechanism estimates the recirculation flow rate based on load, pressure and temperature.

6. The fuel cell system claimed in claim 4, further comprising:

a recirculation passage for recirculating the hydrogen-containing off-gas discharged from the cell unit to the cell unit, wherein a shut-off valve is disposed in the recirculation passage to shut-off the hydrogen-containing off-gas flowing through the recirculation passage.

7. A fuel cell system including a cell unit generating power by separating hydrogen-containing gas and oxygen-containing gas in flow contact with each other, and a recirculation mechanism to recirculate hydrogen-containing off-gas discharged from the cell unit back to the cell unit, comprising:

a flow rate determination mechanism configured to determine whether or not the hydrogen-containing gas fed to the cell unit is less than a predetermined flow rate;

a gas feeding pressure varying mechanism configured to cause the pressure of the hydrogen-containing gas to vary by increasing or decreasing the pressure intermittently when the hydrogen-containing gas fed to the cell unit is determined to be less than the predetermined flow rate; and a bypass passage for bypassing the recirculation mechanism and a three-way valve to switch to the bypass passage hydrogen-containing gas fed toward the cell unit, wherein, when the hydrogen-containing gas fed to the cell unit is determined to be smaller than a predetermined flow rate, a bypass feeding mechanism is provided and the hydrogen-containing gas being fed to the cell unit via the three-way valve is switch to the bypass passage to feed.

8. The fuel cell system claimed in claim 6 further comprising:

a recirculation passage for recirculating hydrogen-containing off-gas discharged from the cell unit to the cell unit;

a shut-off valve to shut off the hydrogen-containing off-gas flowing the recirculation passage;

a temperature sensor to detect a temperature of the cell unit;

a cell temperature determination mechanism configured to determine whether or not the cell unit temperature detected by the temperature sensor has entered a predetermined temperature region including a freezing point temperature; and a recirculation stopping mechanism to stop the recirculation by the shut-off valve when the cell unit temperature has been determined to enter the predetermined temperature region including freezing point temperature.

9. The fuel cell system claimed in claim 4, wherein a check valve is disposed in the recirculation passage to prevent backflow of the hydrogen-containing off-gas flowing in the recirculation passage.

* * * * *